(12) United States Patent
Neumann et al.

(10) Patent No.: US 8,960,602 B2
(45) Date of Patent: Feb. 24, 2015

(54) PARTITION WALL IN AN AIRCRAFT

(75) Inventors: Andreas Neumann, Wakendorf (DE);
Michael Mosler, Hamburg (DE);
Matthias Breuer, Hamburg (DE)

(73) Assignee: Airbus Operations GmbH (DE)

( * ) Notice: Subject to any disclaimer, the term of this patent is extended or adjusted under 35 U.S.C. 154(b) by 769 days.

(21) Appl. No.: 12/394,344

(22) Filed: Feb. 27, 2009

(65) Prior Publication Data
US 2009/0224103 A1 Sep. 10, 2009

Related U.S. Application Data

(60) Provisional application No. 61/067,309, filed on Feb. 27, 2008.

(30) Foreign Application Priority Data

Feb. 27, 2008 (DE) .......................... 10 2008 011 284

(51) Int. Cl.
*B64D 11/04* (2006.01)
*B64D 11/00* (2006.01)
*G09F 21/06* (2006.01)

(52) U.S. Cl.
CPC ............ *B64D 11/0023* (2013.01); *G09F 21/06* (2013.01); *Y02T 50/46* (2013.01)
USPC ..................... 244/118.5; 244/129.4

(58) Field of Classification Search
USPC ............................ 244/118.5, 119, 121, 129.4
See application file for complete search history.

(56) References Cited

U.S. PATENT DOCUMENTS

| | | | | |
|---|---|---|---|---|
| 2,496,910 | A | * | 2/1950 | Fridolph ...................... 160/127 |
| 2,587,698 | A | | 3/1952 | Corn, Jr. et al. |
| 3,002,557 | A | * | 10/1961 | Roth et al. .................... 160/351 |
| 3,294,034 | A | * | 12/1966 | Bodenheimer et al. ........... 410/1 |
| 3,423,121 | A | * | 1/1969 | Lipkin ........................ 296/24.4 |
| 3,871,153 | A | * | 3/1975 | Birum, Jr. .................... 52/794.1 |
| 3,999,727 | A | * | 12/1976 | Rennemann .................. 206/298 |
| 4,021,973 | A | * | 5/1977 | Hegg et al. .................... 52/36.6 |
| 4,134,439 | A | | 1/1979 | Scott |
| 4,188,764 | A | * | 2/1980 | Gode ........................... 52/481.2 |
| 4,203,639 | A | | 5/1980 | VandenHoek et al. |
| 4,842,035 | A | * | 6/1989 | Thompson .................... 160/135 |
| 4,899,962 | A | | 2/1990 | Mueller |
| 5,054,837 | A | | 10/1991 | Chapman |
| 5,083,727 | A | * | 1/1992 | Pompei et al. .............. 244/118.6 |
| 5,165,626 | A | * | 11/1992 | Ringger et al. ............. 244/118.5 |
| 5,393,013 | A | | 2/1995 | Schneider et al. |
| 5,394,923 | A | * | 3/1995 | Danziger ..................... 160/188 |
| 5,482,269 | A | * | 1/1996 | Scott et al. .................... 473/409 |
| 5,497,537 | A | * | 3/1996 | Robinson et al. ............... 24/716 |

(Continued)

FOREIGN PATENT DOCUMENTS

| | | |
|---|---|---|
| DE | 2911065 A1 | 11/1979 |
| DE | 3802331 | 9/1989 |

(Continued)

*Primary Examiner* — Elizabeth A Plummer
(74) *Attorney, Agent, or Firm* — Lerner, David, Littenberg, Krumholz & Mentlik, LLP

(57) ABSTRACT

The invention is based on a partition wall in an aircraft, wherein the partition wall comprises a support element and a tension-mounted material. According to the invention, the support element is composed of individually formed system components, and the tension-mounted material is supported by the support element such that an area-shaped partition wall is created in the aircraft.

18 Claims, 18 Drawing Sheets

(56) References Cited

U.S. PATENT DOCUMENTS

| | | | |
|---|---|---|---|
| 5,555,681 A * | 9/1996 | Cawthon | 52/63 |
| 5,603,370 A * | 2/1997 | Boer | 160/135 |
| 5,743,055 A * | 4/1998 | Conner et al. | 52/282.2 |
| 5,833,329 A * | 11/1998 | Smith et al. | 312/3 |
| 5,967,214 A * | 10/1999 | Beretta | 160/135 |
| 6,206,079 B1 * | 3/2001 | Selgrad | 160/351 |
| 6,250,700 B1 | 6/2001 | Traxler | 296/24.46 |
| 6,257,523 B1 * | 7/2001 | Olliges | 244/118.5 |
| 6,276,634 B1 * | 8/2001 | Bodle | 244/118.5 |
| 6,504,093 B1 * | 1/2003 | Cawley | 174/482 |
| 6,523,779 B1 * | 2/2003 | Michel | 244/118.5 |
| 6,588,705 B1 * | 7/2003 | Frank | 244/118.5 |
| 6,748,710 B2 * | 6/2004 | Gresham et al. | 52/242 |
| 7,243,990 B1 | 7/2007 | Wahl | |
| 7,252,267 B2 * | 8/2007 | Young et al. | 244/118.5 |
| 7,530,529 B2 * | 5/2009 | Bock | 244/118.5 |
| 2002/0023391 A1 * | 2/2002 | Nymark | 52/36.4 |
| 2006/0032155 A1 * | 2/2006 | Thomassin et al. | 52/36.2 |
| 2006/0145002 A1 * | 7/2006 | Van Loon | 244/118.1 |
| 2007/0228216 A1 * | 10/2007 | Wenstrom | 244/118.5 |
| 2008/0034630 A1 | 2/2008 | Horst et al. | |
| 2010/0264268 A1 * | 10/2010 | Schneider | 244/118.5 |
| 2011/0114788 A1 * | 5/2011 | Mosler et al. | 244/118.5 |

FOREIGN PATENT DOCUMENTS

| | | |
|---|---|---|
| DE | 4141606 | 6/1993 |
| DE | 102004044944 | 5/2006 |
| WO | 95/04677 | 2/1995 |

* cited by examiner

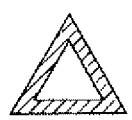
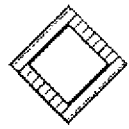
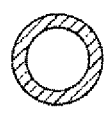
Fig. 7　　　Fig. 8　　　Fig. 9
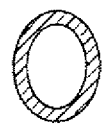
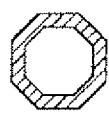
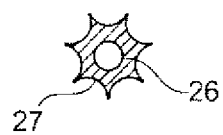
Fig. 10　　　Fig. 11　　　Fig. 12
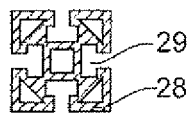
Fig. 13
Fig. 14
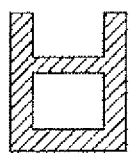
Fig. 15

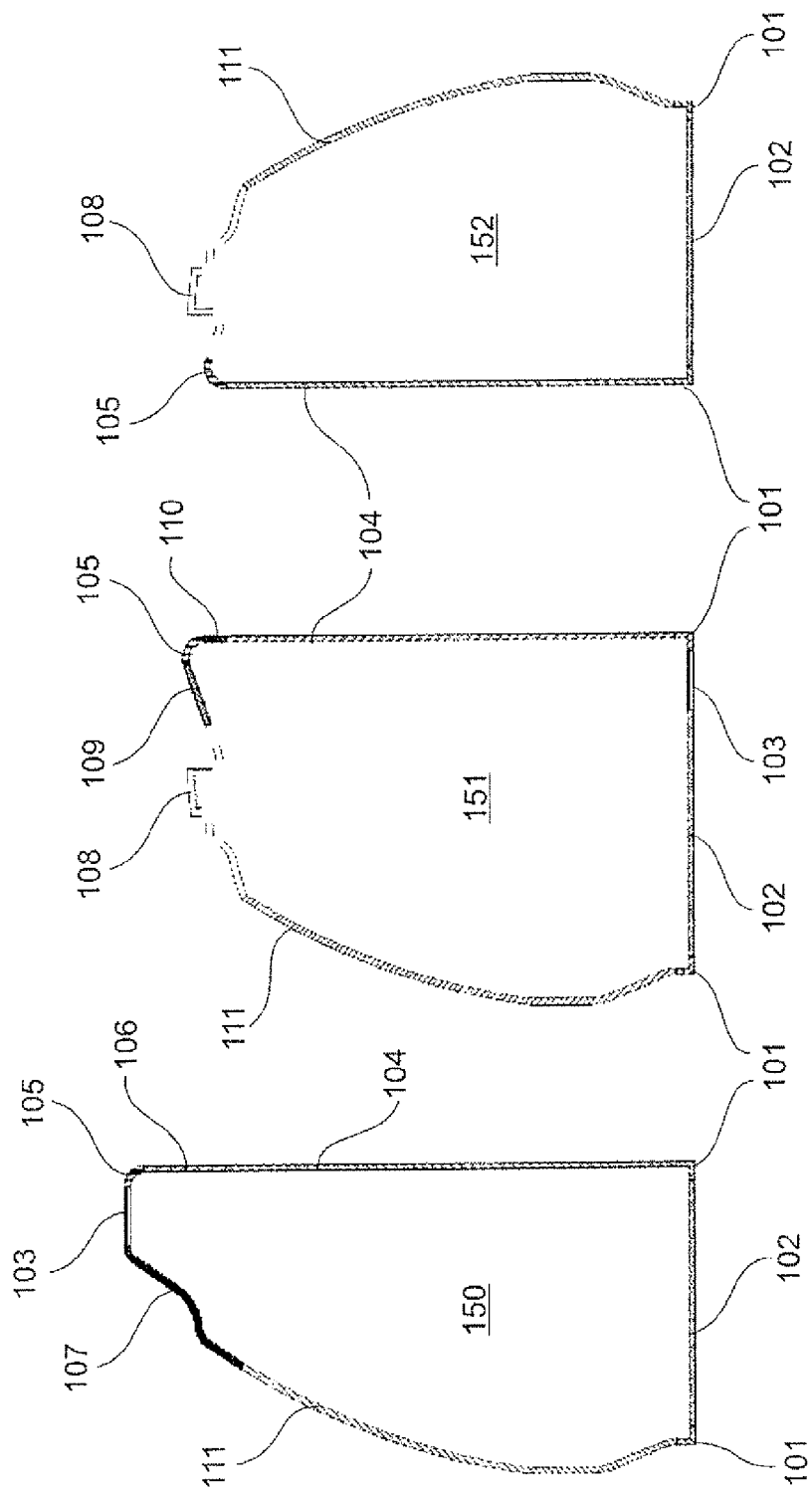

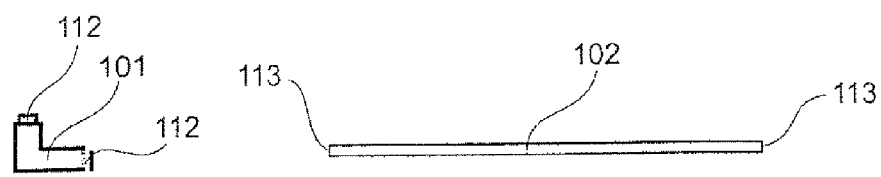
Fig. 29        Fig. 30
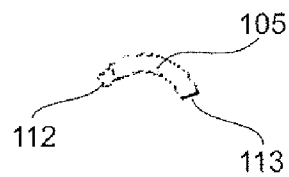
Fig. 31        Fig. 33
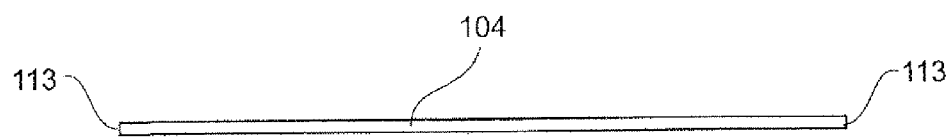
Fig. 32
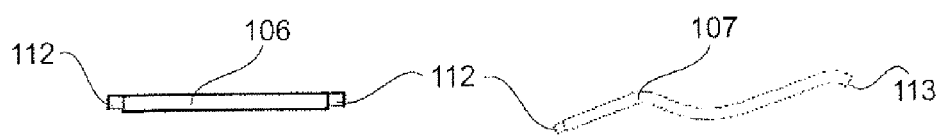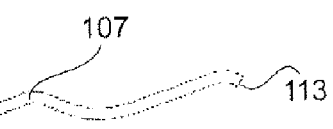
Fig. 34        Fig. 35

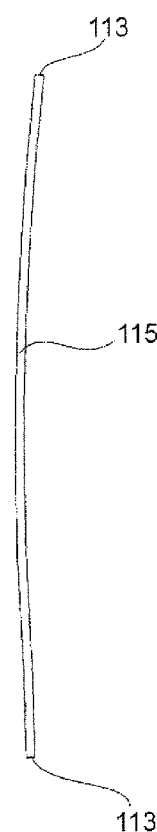
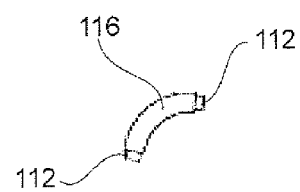
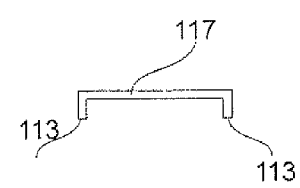
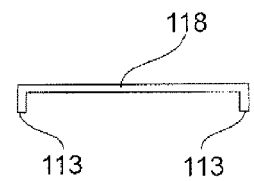
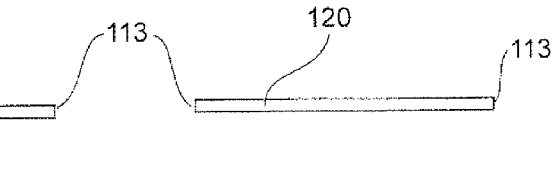
Fig. 43
Fig. 44
Fig. 45
Fig. 46
Fig. 47
Fig. 48
Fig. 49

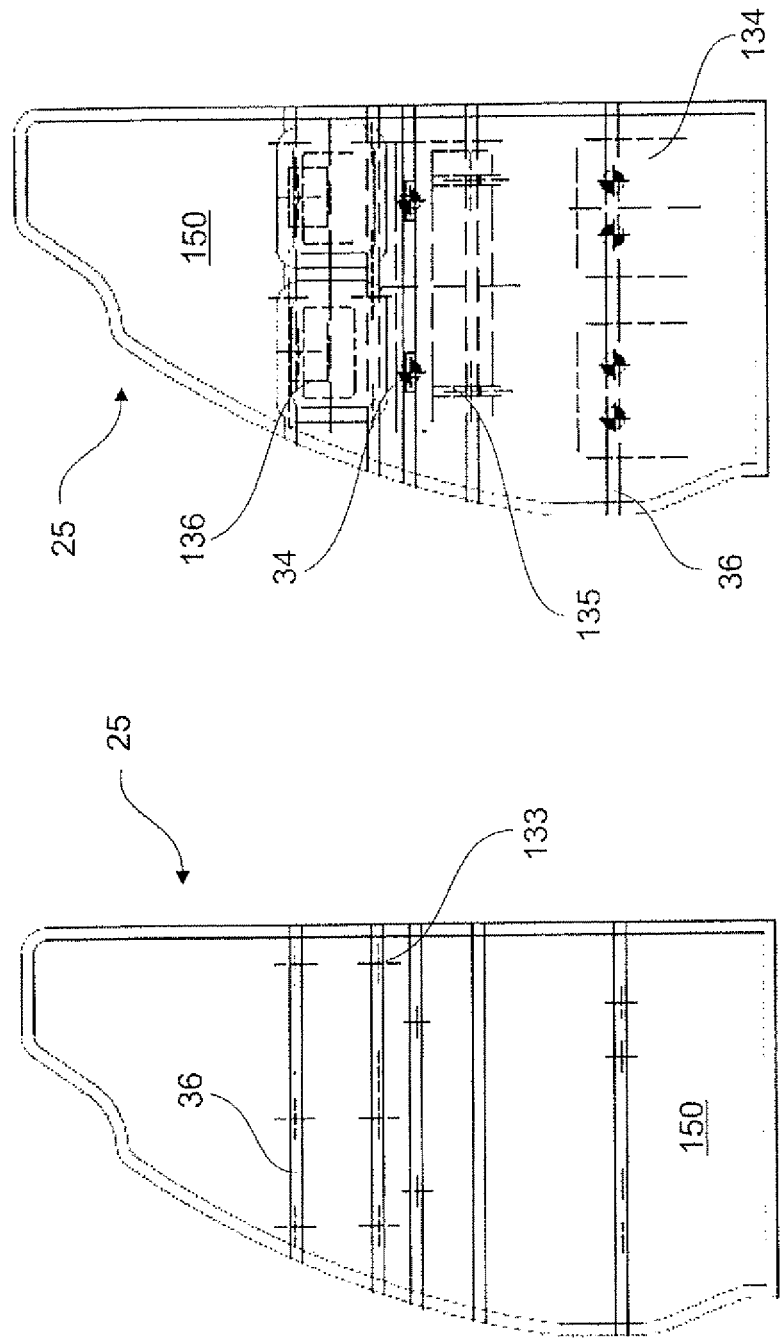

PARTITION WALL IN AN AIRCRAFT

CROSS-REFERENCE TO RELATED APPLICATIONS

This application claims the benefit of the filing date of U.S. Provisional Patent Application No. 61/067,309 filed Feb. 27, 2008, the disclosure of which is hereby incorporated herein by reference.

BACKGROUND OF THE INVENTION

The invention relates to the separation of regions in an aircraft. In particular, the invention relates to a partition wall in an aircraft, comprising a support element and a tension-mounted material, to a modular system for producing such a partition wall, to the use of the partition wall in an aircraft, and to a method for the production for the division of seat rows in an aircraft.

In commercial aircraft, the seat rows for passengers are integrated in the fuselage such that the passengers are seated in the direction of flight, wherein the individual seat rows are arranged across the direction of flight at the window, and one behind another in the direction of the longitudinal axis of the aircraft. Seat rows comprising two or three seats arranged one beside the other are common. The seat rows of the left-hand side and the right-hand side are separated from each other by an aisle. In larger aircraft, which usually can comprise wider fuselages, it is now common that seat rows are also installed in the centre, along the longitudinal axis of the aircraft. These aircraft then comprise two aisles, from which the passengers can get to the seat rows situated in the direction of the widows or to the seat rows situated in the centre. Above these seat rows so-called hatracks can be installed. These are stowage facilities with closable lids for the purpose of stowing cabin baggage.

As a rule, seat rows are taken together to form groups or classes. Usually there are three classes, which among other things differ in that they provide different seat pitches. In order to also provide spatial separation of the individual classes among each other, partition walls are installed which in the region of predetermined seat rows are arranged across the direction of flight. The partition walls extend from the floor to the hatrack, or, where there is no hatrack, to the ceiling and across the entire width of the seat row, in other words either from the interior wall of the fuselage to the aisle (partition wall in the lateral region), or between the two aisles (partition wall in the centre region). The passages between the individual classes, which are separated by partition walls and curtain rails or header panels or curtain headers, are closed off by means of curtains.

Generally speaking, the partition walls are designed in honeycomb construction, wherein the covering panels are made using the prepreg method. The term "prepreg" refers to a semifinished product comprising endless fibres and a non-hardened duroplastic plastic matrix that is above all used in lightweight construction. The endless fibres can be in the form of a pure unidirectional layer, a woven fabric or an interlaid scrim. Prepreg is supplied in a continuous form, rolled onto rollers.

Prepreg can be processed by machine and is thus predominantly used in automated processes which ensure consistency and high quality. Advantages include its undulation resistance and its high fibre volume content. With curing at high temperatures short cycle times are possible.

However, processing requires considerable investment expenditure, for example for autoclaves, placement robots or refrigerated storage.

The narrow sides of the partition walls used in aircraft comprise an edge protection profile made of aluminium, which profile not only closes off the support structure that extends between the cover panels, but also increases the stability of the partition wall. Due to their strength, partition walls are additionally used in order to accommodate mounting parts, for example LCD monitors or baby bassinets.

However, it has been shown that despite their production in the prepreg construction, partition walls are heavy. Furthermore, considerable expenditure is incurred both as a result of the production effort and in the case of alterations. Moreover, the production method leaves little scope for individual designs. In addition, large partition walls, for example as used in the context of the seat rows extending in the fuselage centre, have to be separated before they can be placed at their predetermined positions. This results in separation gaps in the decor, which separation gaps subsequently have to be covered.

DE 41 41 606 A1 describes a device for partitioning an aircraft cabin. In this arrangement the device comprises a carrier, provided to hold a curtain, as well as to a fastening device for connecting the carrier to a cabin structure.

SUMMARY OF THE INVENTION

Accordingly, it is an object of the invention to state a simple and flexible separation of regions of a passenger cabin in an aircraft.

According to an exemplary embodiment of the invention, a partition wall in an aircraft is provided with a support element and a tension-mounted material. In this arrangement the support element comprises individually formed system components of a modular system. The tension-mounted material is supported by the support element such that an area-shaped partition wall is created in an aircraft.

The area-shaped partition wall that is created in this arrangement effectively partitions the passenger cabin in an aircraft. This partition wall, which is created only by means of a support element and corresponding tension-mounted material can replace the partition wall made in the honeycomb-prepreg construction, and in this way may result in very considerable savings in weight. Savings of weight of up to 50% when compared to currently used designs seem to be achievable. In one embodiment the tension-mounted material can be flexible or rigid. The support element that supports the tension-mounted material can also be flexible or rigid. However, to allow the partition wall to assume a predetermined form, the flexible tension-mounted material, for example the film or foil or textile fabric, should be paired with a rigid support element. In conjunction with a rigid support element, the tension-mounted material can also be designed so as to be rigid, for example in the form of a skin or a panel.

Since the textile fabric comprises a fibre composite, sheetlike textile fabrics, for example woven fabrics or knitted fabrics, may be made from this. In this way it is not only possible to individually design the colours of the tension-mounted material, but it is also possible to design the surface texture by means of the different production method. In addition it is possible for logos to be woven in, embroidered in, or printed on.

In the context of this invention the term "textile fabric" also refers to woven fabrics or knitted fabrics in which the fibres are coated or finished before or after processing. Thus the term "canvas", where as a rule the fibre is plastic-coated after processing, also refers to a textile fabric.

Foil or film can be produced ranging from fully transparent to light-proof. In addition it is possible to tint foil or film. Moreover, foil or film can be coated so that it blocks some regions of the light spectrum. Furthermore, it is also possible to print on foil or film.

The design of the tension-mounted material is almost limitless as far as the material, shape, colour or transparency or translucency is concerned, in particular in view of a material mixture comprising textile fabric and foil or film. Moreover, individual design elements can be combined among themselves within a tension-mounted material. For example, a non-transparent tension-mounted material, which may be designed so as to be coloured, may be interrupted by a round transparent or translucent surface into which, in addition, a company logo, which may be non-transparent, can be incorporated. Of course it is possible to pair flexible tension-mounted material with rigid tension-mounted material. Also imaginable are designs in which the tension-mounted material comprises open work, or in which part of the support element does not comprise tension-mounted material. Of course, the flexible tension-mounted material can also be elastic. This provides an advantage in that the tension-mounted material, already when it is slightly tensioned, is already free of any folds and/or impressions, thus assuming a distinctive appearance.

Rigid tension-mounted material in the shape of, for example, panels, is stable in the face of forces acting on it. By means of a suitable attachment option, quick exchange of the rigid tension-mounted material for flexible material can become possible. For reasons relating to weight, the rigid tension-mounted material is predominantly made from carbon-fibre reinforced plastic. However, applications comprising wood, metal, alloys and/or composite materials are also imaginable. The rigid tension-mounted material can be dyed or comprise a surface of imitation wood. It is also possible to cover this tension-mounted material with leather or imitation leather. The support element may, for example, comprise the rigid tension-mounted material at the bottom, while comprising the flexible tension-mounted material at the top.

In particular when these types of partition walls are used in an aircraft it is important for the tension-mounted materials to comprise non-combustible materials. In some cases it may well be possible for the tension-mounted material that is being used to be self-extinguishing. In any case the use of the tension-mounted material must not increase the fire load.

As a result of the support element comprising individually formed system components of a modular system it is possible to match the outside contour of the support element to the situation that exists in the aircraft. It is thus possible by means of a small number of system components to generate a multitude of different support elements. These support elements can be used to produce lateral or central partition walls. Furthermore, it is possible from a small number of system components to produce partition walls that can be used in different aircraft model series.

In a further embodiment of the invention the support element is a framework. The framework is dimensioned such that it can optimally cope with the loads that are expected to occur. In this arrangement the framework need not be closed, it can also be designed so as to be open, for example in a V-shape, and can thus be given the required stability only at the time of installation at its subsequent installed location, for example in that it is connected to the floor, ceiling or a wall.

The partition wall can be designed such that to a very large extent it is congruent with the area to be divided. For example, it is possible to adapt the framework of the partition wall, which separates a seat row that extends across the direction of flight from the seat row that extends parallel to the former, to the curved surfaces of an interior wall of a fuselage, and/or of a hatrack, or, where there is no hatrack, to adapt it to a ceiling contour. Any imaginable geometric shapes of frameworks are possible, for example D-shaped or round. The flexible tension-mounted material can be tensioned over the rigid framework. The framework can also be reinforced by an additional cross-strut. Moreover, a cross-strut provides additional attachment options for various mounting parts, for example LCD monitors, baby bassinets or literature pockets. If required several cross-struts can be incorporated. The cross-struts can be quickly detachable by means of quick-acting closure devices, and in a certain circumference, depending on the geometric shape of the design of the support framework, can be displaced in positive or negative Z-direction (or from top to bottom and vice versa).

Attachment of the flexible tension-mounted material can take place such that in the plane in which it is stretched it is attached by means of suitable attachment elements, for example by means of hooks, rubber straps, cords or similar. Furthermore, the tension-mounted material can be placed around the framework and can, for example, be attached to the rear of the framework or to the rear of the tension-mounted material.

In a further embodiment of the invention the framework is designed so that it can be disassembled or folded. The ability to disassemble/fold the framework makes it possible to place the framework through openings that are smaller than the assembled/unfolded framework. It is thus possible to take, in particular, large partition walls to the position where they will subsequently be installed, without the need to divide the partition wall into segments. Separation of the partition wall, as is common in the hitherto-used production processes, inevitably results in separation joints that will subsequently have to be covered. As a result of the ability to disassemble/fold the framework it is also possible, at short notice, to install the partition wall in some other position, because the framework can be quickly disassembled/folded up and transported to another position. Furthermore, the ability to disassemble/fold the framework makes it possible for the framework to be carried along in its disassembled/folded state and to be installed only when required. In this arrangement a flexible tension-mounted material suggests itself because said material can, for example, be folded or rolled-in as required.

Furthermore, the flexible tension-mounted material can be rigidly connected to the framework so that, when the framework is folded out, the tension-mounted material is tensioned at the same time.

In a further embodiment of the invention the system components of the partition wall are designed as spars, wherein the spars are pluggable.

The pluggability of the spars can, for example, be obtained by a connector-coupling system formed to their ends. In this arrangement the connector can, for example, be formed as a centring pin that engages a coupling that is formed as a centring aperture. Such a connector-coupling system is associated with an advantage in that the individual spars can be interconnected only in a manner predetermined by the connector-coupling system. Of course, a connection system is also imaginable in which the spars can be interconnected in any desired manner. For example, the spars can be produced in such a way that their ends only comprise centring apertures into which centring pins are inserted during installation. The spars can also be formed in any desired manner. Such forming can take place in a two-dimensional or in a three-dimensional manner.

In a further embodiment of the invention the spars are affixable among themselves by means of a tensioning mechanism. The tensioning mechanism makes it possible for the framework to be able to be brought from the folded state to the installed state and to be fixed. As a rule, for this purpose the ends of the spars are movable and connected to each other in a captive manner. Of course, it is possible that, when the framework is folded up, at one end the spars are separated from each other so as to make it possible for the framework to be foldable at all. All the spars of the framework can be connected to each other, for example with a steel cable or textile cord, so that the process of tensioning such a cable or cord brings the framework from its folded-up state to its installed state. Tensioning of such a cable or cord can, for example, take place by means of a ratchet mechanism.

The tensioning mechanism can also be a cross-strut which when inserted in the framework prevents the spars from hingeing, and thus prevents the installed framework from folding.

Moreover, the framework can comprise a tubular frame or spars whose individual lateral tubes, upper tubes and lower tubes are screwed to each other or are interconnected by means of quick-acting closure devices. In this case a telescopic cross-strut is used which by means of quick-acting closure devices can be displaced in positive or negative Z-direction, in other words upwards or downwards. Said telescopic cross-strut is used to increase the rigidity and to affix mounting parts such as baby bassinets, monitors or similar. Furthermore, in the region of the centre partition wall a stiffening centre strut can be used.

Furthermore, all the partition wall tension mounting devices comprising foil or film or fabric can also be used as projection surfaces for multimedia applications (projection-screen principle).

The cross-section of the spar can match the intended purpose and the loads that are to be expected. For example, the cross-section of the spar can comprise the shape of a circular, oval, square, rectangular or polygonal tube. However, the cross-section can also be open and resemble a U, or it can form a hollow-chamber profile. The spar can also be made from a solid material. In addition, the profile can also be profiled by grooves, for example T-grooves, that extend along its centre axis. Attachment elements can be inserted into these grooves, which attachment elements can be used to connect the frameworks, at the positions provided in the aircraft, to the supporting structures, for example the floor, ceiling, hatrack or interior wall of the fuselage. The attachment material can remain so as to be movable in a linear manner in the groove, or so as to be fixed in the groove. The attachment material can, for example, comprise loops, eyelets, hooks, threaded holes or threaded bolts. However, any other type of connection, for example involving hooks or eyelets, is also imaginable, as is a floating bearing arrangement.

In a further embodiment of the invention the tensioning mechanism comprises a quick-acting closure device, or the framework comprises quick-acting closure devices and can be disassembled quickly. The quick-acting closure device ensures that the framework can be changed from its folded state to its installed state practically in a single operating step. This quick-acting closure device can, for example, replace the ratchet mechanism mentioned in the paragraph above. Furthermore, the cross-strut mentioned above can be attached to the framework by means of such a quick-acting closure device. Such a quick-acting closure device can, however, also be designed for tool-less operation. For example, undoing or affixing can be caused by hingeing a tension lever whose actuation area is designed as a cam.

In a further embodiment of the invention one of the spars of the partition wall comprises a joint. Affixing such a joint to the connecting location between two spars, for example at their ends, makes it possible, for example, to hinge the spars so that by means of such a joint the framework can be folded together and folded out. Moreover, such a joint, if it is affixed along a spar, makes it possible to incorporate in the framework an additional spar, which spar can, for example, be used for the connection of monitors, baby bassinets. etc., with said spar dividing the framework for example cross-wise or longitudinally, without this jeopardising the ability to disassemble/fold the framework in conjunction with this additional spar. This joint makes it possible to incorporate the additional spar in a framework in which the attachment sections to which the additional spar is attached are not parallel to each other in the installed state of the framework. In particular if the lateral partition wall along the window region is used, the spar of the framework, which spar faces the interior wall of the fuselage, is most often curved along the interior wall of the fuselage, while the opposite spar, i.e. the spar facing the aisle, is often straight, but it can be shaped as desired. This joint makes it possible for the additional spar to now also be attached to a curved section of the framework.

In a further embodiment of the invention one of the spars of the partition wall is designed so as to be telescopic. The telescopic design of the one of the spars ensures that in each case the length of this spar can be adjusted to any given purpose. For example, the telescopic design of the spar makes it possible to adjust the height and/or width of the framework to local circumstances. Moreover, the telescopic action of the spars can be used to tension the tension-mounted material. The telescopic action of a spar that has additionally been incorporated in the framework, in particular in conjunction with a joint, can be used to vary the position of this additional spar relative to the other spars.

In a further embodiment of the invention one of the spars of the partition wall comprises a very light and stable material. Possible materials from which the spar can be produced include, for example, aluminium, carbon-fibre reinforced plastic, titanium or magnesium alloys. It is not necessary for all the spars from which the framework is made to be constructed from the same material. For production of spars comprising aluminium as a material the design as an extruded profile suggests itself. With the use of this method even profile cross-sections with complicated shapes can be produced economically. If laminated materials, for example carbon-fibre reinforced plastics, are used, it may be sensible if the entire framework is produced in one form rather than being composed of individual spars. Since the material titanium requires quite elaborate production methods, it tends to be more suitable for spars comprising a more simple cross-section. It is not necessary for the spars used in the framework to have identical cross-sectional geometric shapes.

In a further embodiment of the invention the partition wall comprises a cross-strut. In this arrangement the support element is stiffened by means of the at least one cross-strut. Mounting parts are attachable to the at least one cross-strut.

This at least one cross-strut can be inserted into the support element of the partition wall at any desired height. Mounting parts, for example LCD monitors, baby bassinets or literature pockets are attachable to these cross-struts. Since, as a rule, these mounting parts are situated at different heights, the cross-struts that are used to attach these mounting parts can be fully integrated in the support element. A larger number of cross-struts also results in higher strength of the partition walls. The cross-struts can be connected to the support element so as to be either fixed or detachable. It is, for example, possible for LCD monitors and literature pockets to be connected to the partition wall so that they are fixed, while the baby bassinet, which, as a rule, is installed between the LCD monitor and the literature pocket, is designed to be removable. In this case the connecting elements for attachment of the various mounting parts comprise different designs. Thus it is possible, for example, to provide baby bassinets with attachment means that can be both quickly installed and quickly deinstalled. This then makes it possible, when required, to install baby bassinets for one flight only, and to remove the baby bassinets after completion of the flight.

If further stiffening devices on the partition wall are deemed to be necessary, additional longitudinal struts that are connected to the cross-struts can be incorporated in the support element.

In a further embodiment of the invention an illumination device is provided in the framework. By means of the illumination device one side of the tension-mounted material can be illuminated at least in part. The illumination device can be installed circumferentially or partially on the edge or on the edge regions of the framework. Furthermore, the illumination device can be affixed centrally within the framework. With the use of LED illumination technology it is, for example, possible to economically generate even illumination of the tension-mounted material. For example it is possible to design the tension-mounted material so that it is coloured and light-proof, or coloured and translucent, while in the centre a circular recess for a company logo is provided. It is then possible to insert into this recess a clear film onto which the logo has been printed, for example in a light-proof or translucent manner. Furthermore, it is possible to insert a woven fabric that resembles a net, into which the company logo is woven in a light-proof manner. The artificial light thus falls through the transparent film or the net, and the light-proof company logo is practically surrounded by light. Moreover, light effects can be generated on such a tension-mounted material, for example the simulation of an evening sky with the sun setting and with stars rising, in a manner that is similar to that of the effects that can be created on the cabin ceiling.

In a further embodiment of the invention the illumination device is attached to the at least one cross-strut of the partition wall.

For example, on a cross-strut an illuminateable sign can be installed that shows passengers the direction to an exit. Furthermore, it is possible, for example, between two cross-struts that are spaced apart from each other to incorporate illumination means in the form of, for example, fluorescent light tubes or light guides, which are aligned so as to be vertical to the cross-struts. It is, of course, also possible for lighting means to be affixed so as to be parallel to the cross-struts. Moreover, it is also possible to install the lighting means in such a way that, at least when viewed in longitudinal direction of the aircraft, they do not project from the partition wall. With these illumination means it is possible, for example, to illuminate from the inside any logos that are worked into the tension-mounted material. As a rule, such partition walls comprise tension-mounted material on two sides, so that the illumination means are not visible to aircraft passengers.

In a further embodiment of the invention a cable extends to the illumination device within at least one of the spars of the partition wall.

As a rule, the spars are designed as hollow profiles so that within the spars there is sufficient space in order to install cable so that it is invisible to passengers. In addition, the wall of the spars protects the cables installed in this manner. The cables connect the illumination means to the power supply. Within the spars, the cables can be guided and/or affixed by means of cable holders that have additionally been put in place. Of course, instead of putting cables in place, lines or hoses can also be put in place.

In a further embodiment of the invention it is advantageous if the partition wall comprises emergency exit illumination. As a rule, the emergency exit illumination will be integrated in the framework just above the floor, namely on the side facing the aisle. Instead of, or in addition to, the emergency exit illumination, emergency illumination can also be installed. The tension-mounted material needs to be attached to the framework so that the illumination bodies of the emergency exit illumination and/or emergency illumination are recessed in the tension-mounted material. However, it is also possible for transparent materials, for example clear film, to be used in the tension-mounted material at the positions that extend over the illumination bodies.

In a further embodiment of the invention the tension-mounted material can be mounted on both sides of the framework. The space resulting between the two tension-mounted materials will usually amount to the thickness of the framework. The two tension-mounted materials need to correspond neither in relation to their geometric shape nor in relation to their design as far as the colour or translucence is concerned. Moreover, on one side the tension-mounted material can be rigid, for example in the form of panels, while on the other side it can be flexible, for example in the form of textile fabric and/or foil or film. In order to suppress noise transmission and/or thermal transmission, at least in some parts insulation can be placed between the two tension-mounted materials.

In a further embodiment of the invention it is advantageous if the tension-mounted material is connectable to the support element by means of a connection element. With the use of a connection element between the support element and the tension-mounted material the outside contour of the tension-mounted material can largely be decoupled from the geometric shape of the framework. For example, a rectangular framework can stretch a circular tension-mounted material whose area comprising writing is considerably smaller than the area of the framework, which area comprises writing. The tension-mounted material can, for example, be attached to loops that encompass at the at least one spar of the framework. The loops can be rigidly connected to the spar or they can be designed so that they are slidable along the spar. With each loop a press- or snap fastener can be rigidly connected, to which the tension-mounted material is attached. The loop can be produced from only slightly elastic material, for example a strap that can comprise a flat-woven cord, or from a more elastic material, for example a rubber strap. Of course, it is also possible for the loop to be rigidly connected to the tension-mounted material, and for said loop to be fastened to the spar by means of suitable attachment material.

It may also be possible for the tension-mounted material to be attached to the framework by means of a hook-and-loop-type fastener or a zip. Moreover, the tension-mounted material can comprise eyelets distributed around the edge region. In order to prevent the eyelets from being torn out, piping can be worked into the edge of the tension-mounted material. For example, a rubber cord can be threaded through the eyelets, preferably always in the same direction. In this way the rubber cord forms loops between the individual eyelets, which loops extend from the front of the tension-mounted material over its edge to its rear. These loops can then be hooked into corresponding hooks on the spar, which hooks are preferably located in the middle between the eyelets. However, the hooks can also be attached to the tension-mounted material. If the hook is attached to the tension-mounted material, for assembly the loop needs to be placed around the spar, before said loop can be hooked into the hook on the tension-mounted material.

The selection and distribution of the connection elements takes place in such a manner that the tension-mounted material within the framework is to the largest possible extent tensioned from all sides so that no impressions or folds arise and consequently the tension-mounted material has a distinctive appearance. Tensioning from all sides becomes possible if the framework is closed.

In a further embodiment of the invention the support element of the partition wall comprises a frame. In this arrangement a tongue-like device that is rigidly connected to a substructure of the aircraft projects into the frame and affixes the partition wall only in longitudinal direction of the aircraft.

The term "substructure of the aircraft" can refer to cabin installation elements which are, for example, designed as a supply duct or a hatrack. In the absence of such cabin installation elements the tongue-like device can also be affixed to the substructure of the aircraft, which substructure is used to accommodate the cabin installation elements. This substructure is, as a rule, directly connected to the primary structure of the aircraft. By affixing them only in longitudinal direction of the aircraft in the region of the partition wall that faces the ceiling of the aircraft, no forces that act across the longitudinal direction of the aircraft can be transmitted by the partition wall to the substructure or vice-versa. Such forces that act across the longitudinal axis of the aircraft can, for example, arise as a result of pressure when the cabin extends, or as a result of torsional movement of the passenger cabin, for example during takeoff or landing. Furthermore, in the case of unexpected loads acting on the aircraft, as would be the case for example during an emergency landing, such an attachment of the partition wall prevents the partition wall from introducing forces to adjacent trim components in the passenger cabin—a situation which could then possibly result in these trim components being destroyed.

In a further embodiment of the invention the frame of the partition wall comprises a first and a second longitudinal spar and a first and a second cross-spar. The first and the second cross-spar each comprises a slot that extends along their direction of longitudinal extension, wherein the tongue-like device is fed through the slots.

The position of the first and of the second cross-spar relative to the tongue-like device is such that the two cross-spars in any situation are connected to the tongue-like device. As a rule, the slot extends along the direction of longitudinal extension of the respective cross-spar. The slot is designed in such a way that it affixes the tongue-like device only in longitudinal direction of the aircraft. In cross-direction, which extends across the longitudinal direction of the aircraft, the tongue-like device is spaced apart from the slot wall. For reasons of stability, the first and the second longitudinal spar, as well as the first and the second cross-spar can also be welded together.

In a further embodiment of the invention the frame is rigidly connected to one of the at least one cross-struts of the partition wall.

Of course, the cross-strut can also be welded to the frame. The cross-strut results in further stabilisation of the frame and of the partition wall. Expediently the frame with the cross-strut and the framework is designed in such a way that these components are flush with each other. After the framework has been covered with the tension-mounted material, this results in a distinctive appearance of the partition wall without any curvatures resulting from components installed in the framework.

In a further embodiment of the invention a modular system is used to produce a first partition wall, and a second partition wall that differs from the first partition wall.

As a result of this modular system or building-block system, from differently formed spars it is possible to produce partition walls with different contours. It is thus possible to produce low, high, narrow or wide partition walls. Furthermore, it is possible to use spars that are shaped in such a way that they at least partly follow the inside contour of the passenger cabin. Thus, by means of this modular system it is not only possible to produce differently-dimensioned partition walls for one aircraft type, which partition walls separate a passenger cabin into different regions, but also to produce partition walls for different aircraft types. Thus, by means of this modular system it is possible to produce a multitude of differently-shaped partition walls.

In a further embodiment of the invention a partition wall with a support element and a tensioning element is used in an aircraft, wherein the support element is composed of individually formed system components of a modular system. The tension-mounted material is supported by the support element such that an area-shaped partition wall in the aircraft is created.

In a further embodiment of the invention a method is used for dividing seat rows in an aircraft by composing a support element from individually formed system components of a modular system, by arranging the support element, by stretching a tension-mounted material onto the support element for the purpose of a partition wall, and by arranging the partition wall between two seat rows that are to be partitioned. As a rule, the partition wall is used in a commercial aircraft in order to partition the passenger space into individual classes. Partitioning into three classes is common. Partitioning usually takes place in that seat rows located one behind the other, which seat rows are arranged across the direction of flight, are separated by such a partition wall. If these partition walls additionally comprise sound insulation, which can also be integrated in the tension-mounted material, any noise transmission between the individual classes is effectively suppressed. Of course, it is also possible to longitudinally partition the seat rows arranged in a passenger space, in other words in the direction of flight. This can, for example, be desirable if a person who is sick is to be transported, and if said person is to be afforded privacy.

Further details and advantages of the invention are stated in the subordinate claims in conjunction with the description of exemplary embodiments that are explained in detail with reference to the drawings.

BRIEF DESCRIPTION OF THE DRAWINGS

The following figures show:
FIG. 7 a cross-section of a first spar;
FIG. 8 a cross-section of a second spar;
FIG. 9 a cross-section of a third spar;
FIG. 10 a cross-section of a fourth spar;
FIG. 11 a cross-section of a fifth spar;

FIG. 12 a cross-section of a sixth spar;
FIG. 13 a cross-section of a seventh spar;
FIG. 14 a cross-section of a eighth spar;
FIG. 15 a cross-section of a ninth spar;
FIG. 26 a first lateral partition wall;
FIG. 27 a second lateral partition wall;
FIG. 28 a third lateral partition wall;
FIG. 29 a first system component;
FIG. 30 a second system component;
FIG. 31 a third system component;
FIG. 32 a fourth system component;
FIG. 33 a fifth system component;
FIG. 34 a sixth system component;
FIG. 35 a seventh system component;
FIG. 43 a twelfth system component;
FIG. 44 a thirteenth system component;
FIG. 45 a fourteenth system component;
FIG. 46 a fifteenth system component;
FIG. 47 a sixteenth system component;
FIG. 48 a seventeenth system component;
FIG. 49 an eighteenth system component;
FIG. 55 a lateral partition wall with cross-struts;
FIG. 56 a lateral partition wall with mounting parts.

DETAILED DESCRIPTION

Figure 1:
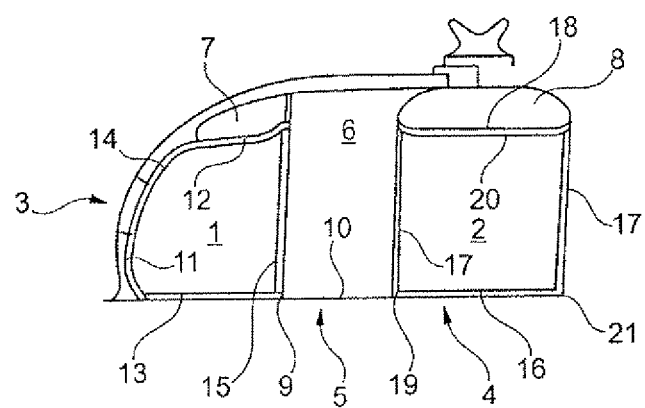
FIG. 1 a front view of two partition walls according to the invention in an aircraft.
Figure 2:
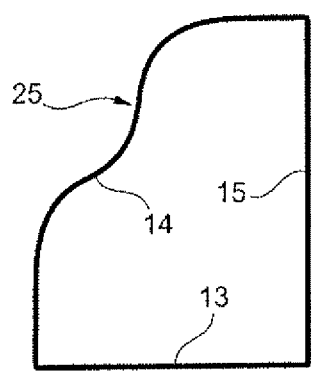
FIG. 2 a front view of a first framework geometry.
Figure 3:
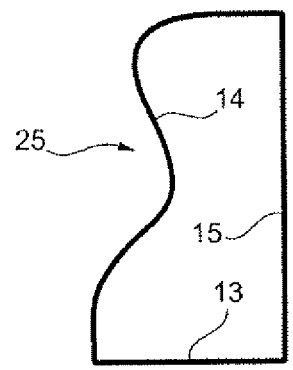
FIG. 3 a front view of a second framework geometry.

It should be pointed out that identical components in the individual figures have the same reference characters.

FIG. 1 shows a front view of a lateral partition wall 1 and a central partition wall 2 for partitioning seat rows in a passenger aircraft. The seat rows (not shown in the diagram) are installed on the one hand on the window side 3, and on the other hand in the centre region 4 of the aircraft. Between the seat rows there is an aisle 5 which extends in longitudinal direction of the aircraft, which aisle 5 leads from one passenger class to the next, and by way of which aisle 5 the passengers have access to their seats. Between the two partition walls 1 and 2 there is a curtain 6, which blocks the view from one passenger class to the other. In the upper region above the seat rows, so-called hatracks 7 and 8 are arranged, which accommodate the cabin baggage of passengers, with said hatracks 7 and 8 being closed off by hinged covers (not shown).

A first spar 13 of the lateral partition wall 1 extends from the initial point 9, which is situated on one side of the aisle 5, along the flat floor 10 to the window side 3. From there a second spar 14 extends along the curved interior wall 11 of the fuselage and along the underside 12 of the hatrack 7 to a third spar 15, which extends from the initial point 9, perpendicular to the floor 10, to the underside 12 of the hatrack 7.

Opposite the initial point 9, on the other side of the aisle 5, there is the start point 19, from which a first spar 16 extends along the floor 10 to the point 21. Both from point 21 and from the start point 19 in each case a second spar 17, which is perpendicular to the floor 10, extends to the underside 20 of the hatrack 8. The two profiles 17 are connected by a third spar 18, which extends along the underside 20 of the hatrack 8.

Figures 4, 5:
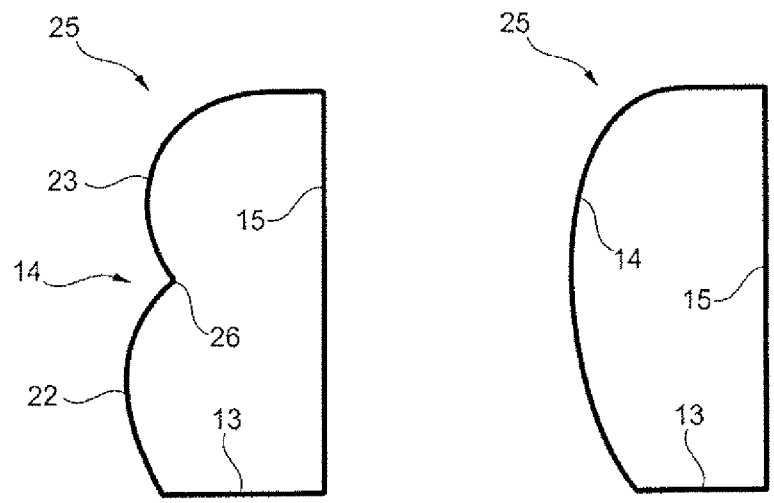
FIG. 4 a front view of a third framework geometry.
FIG. 5 a front view of a fourth framework geometry.
Figure 6:
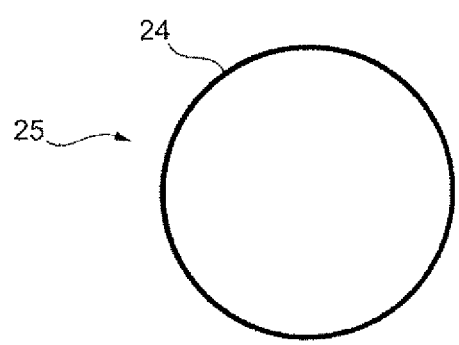
FIG. 6 a front view of a fifth framework geometry.

FIGS. 2, 3, 4, 5 and 6 show front views of five exemplary embodiments of a framework 25. In FIGS. 2, 3, 4 and 5 the framework 25 comprises two straight spars 13 and 15 that are joined so as to be perpendicular to each other, as well as a spar 14, which in the individual figures is curved differently. In FIG. 4 the second spar 14, due to the kink 26, can also comprise two individual spars 22 and 23 that are rigidly connected to each other. FIG. 6 is a special case in that the framework 25 comprises a spar 24 that is curved in a circular manner.

FIGS. 7, 8, 9, 10, 11, 12, 13, 14 and 15 show nine different examples of the multitude of possible spar cross-sections, as used for the spars 13, 14, 15, 16, 17, 18, 22, 23 and 24. Thus the tubular cross section shown in FIG. 7 is triangular, in FIG. 8 square, in FIG. 9 circular, in FIG. 10 oval, and in FIG. 11 regular octagonal. In FIG. 12 the spar has a cross section of a circular profile tube whose wall 26 on the outside comprises regular grooves 27 that are arranged circumferentially in the shape of a circle. In FIG. 13 the spar has a cross section of a square profile tube whose lateral walls 28 comprise T-grooves 29. T-groove sliding blocks (not shown) can be inserted into these T-grooves 29. In FIG. 14 the spar has the cross section of a U-profile, while in FIG. 15 it has the cross section of a hollow-chamber profile.

Figure 16:
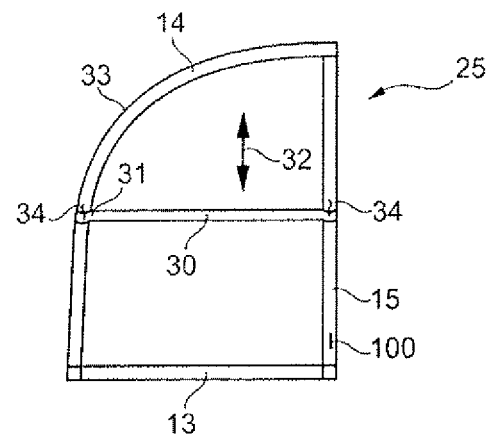
FIG. 16 a first framework for use in the aircraft.

FIG. 16 shows a front view of the framework 25 for the lateral partition wall 1 comprising the spars 13, 14 and 15. In addition, for the purpose of stiffening, a telescopic spar 30 that extends parallel to the spar 13 is used. At its end facing the curved spar 14, said telescopic spar 30 comprises a joint 31. When the telescopic spar 30 is moved in height along the arrow 32 and reaches the region of the arc 33, the joint 31 ensures that the telescopic spar 30 continues to extend parallel to the spar 13. Since in the region of the arc 33 the clearance between the spar 14 and the spar 15 is also reduced, due to its telescopic action the spar 30 adapts to this changed condition. Fastening of the telescopic spar 30 to the spars 14 and 15 takes place by way of quick-acting closure devices, of which only the levers 34 are visible in the diagram. By way of suitable attachment devices, LCD monitors, baby bassinets or literature pockets (none of them shown) can be attached to the telescopic spar 30. In the spar 15, at the height of the spar 13, there is an emergency exit marking 100.

Figure 17:
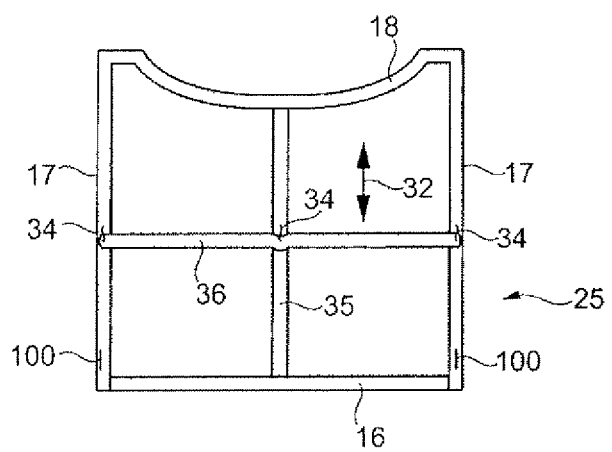
FIG. 17 a second framework for use in the aircraft.

FIG. 17 shows a front view of the framework 25 for the central partition wall 2, comprising the spars 16, 17 and 18. In addition, for reasons of stability, a further spar 35 has been used longitudinally, which further spar 35 is joined so as to be perpendicular to spar 16 and is rigidly connected to the spars 16 and 18. Parallel to the spar 16 there is a cross-strut 36 that is adjustable in height, as indicated by the arrow 32. The cross-strut 36 is used to accommodate equipment components (not shown), for example LCD monitors, baby bassinets or literature pockets. When the cross-strut 36 has attained the desired height, it is detachably attached to the two spars 17 and the further spar 35 by means of quick tensioning devices, of which only the levers 34 are shown. In addition, the cross-strut 36 increases the rigidity of the framework 25. In the spar 17, at the height of the spar 16, there is an emergency exit marking 100.

Figure 18:
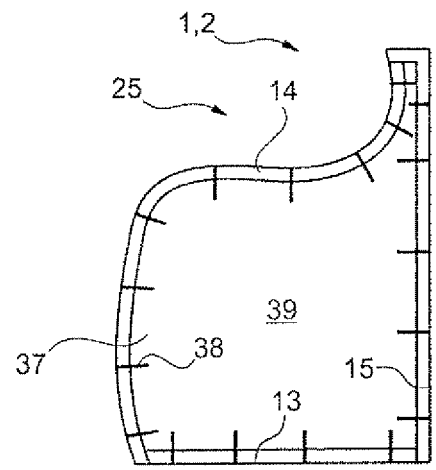
FIG. 18 a front view of a first embodiment of the partition wall according to the invention.
Figure 19:
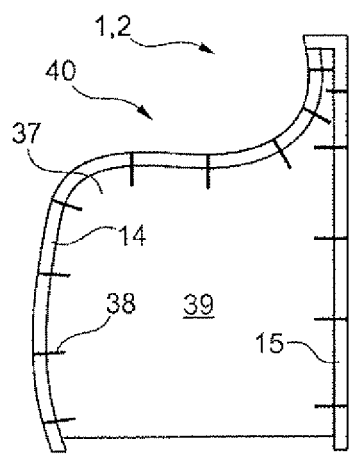
FIG. 19 a front view of a second embodiment of the partition wall according to the invention.

FIGS. 18 and 19 show a front view of the partition wall 1, 2 according to the invention. In FIG. 18 the closed framework 25, which comprises the spars 13, 14 and 15, encompasses an area 37. By means of loops 38 that have been placed around the spars 13, 14 and 15 the framework 25 stretches in the area 37 a tension-mounted material 39 whose outer shape largely corresponds to the area 37. The loops 38 are distributed over the entire circumference of the edge region of the tension-mounted material 39 so that as a result of them the tension-mounted material 39 is tensioned without any folds or impressions. In the present exemplary embodiment the tension-mounted material 39 comprises a textile fabric.

In contrast to the exemplary embodiment of FIG. 18, in the exemplary embodiment of FIG. 19 there is no spar 13 on the floor. Thus the framework 40 obtains its rigidity only when it is subsequently installed in its location. Moreover, there are no loops 38 that point in the direction of the floor. The tension-mounted material 39 is thus not stretched in the direction of the floor.

Figure 20:
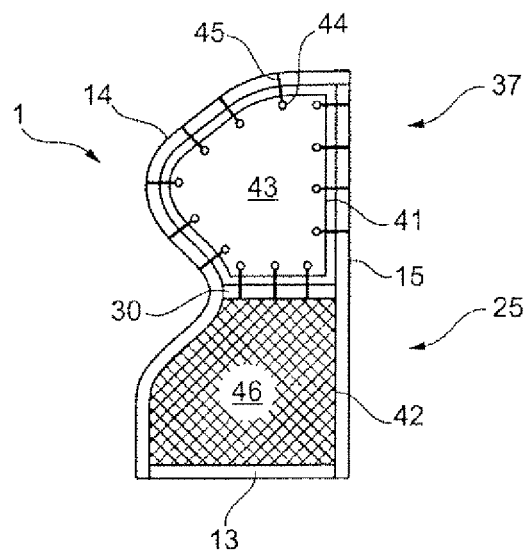
FIG. 20 a front view of a third embodiment of the partition wall according to the invention.

FIG. 20 shows a front view of the partition wall 1, 2 according to the invention, wherein the framework 25, which comprises the spars 13, 14 and 15, at the centre comprises an additional spar 30. This spar 30 divides the area 37, which is stretched by the framework 25, into an upper area 41 and a lower area 42. In the upper area 41 the upper part of the framework 25 with the spar 30 stretches the tension-mounted material 43, whose dimensions largely correspond to that of the upper area 41. The tension-mounted material 43 comprises eyelets 44 circumferentially in the edge region. Through these eyelets 44, straps 45 are guided, by way of which the tension-mounted material 43 is stretched, wherein said straps 45 are closed by means of hook-and-loop-type fasteners (not shown). Of course, the straps 45 can also be substituted by rubber straps, clips or clamps, for example hard plastic rings that are to be opened in one position. The eyelets 44 ensure better force distribution within the tension-mounted material 43, thus effectively preventing any tearing out due to forces acting on points as a result of the straps 45. The spar 30 makes it possible for the tension-mounted material 43, which in this embodiment too is a textile fabric, to be able to be tensioned in the direction of the lower area 39. In this exemplary embodiment the lower area 39 comprises a skin 46, whose outer dimensions largely coincide with the geometry of the lower area 39. By means of quick-acting closure devices, the skin 46 can be attached to the lower part of the framework 25. Predominantly for reasons relating to weight, the skin 46 comprises dyed carbon-fibre reinforced plastic, wherein said carbon-fibre reinforced plastic may be coated with imitation wood or with leather or imitation leather. The carbon-fibre reinforced plastic can also be substituted by light metal, alloys, wood or composite materials.

Figure 21:
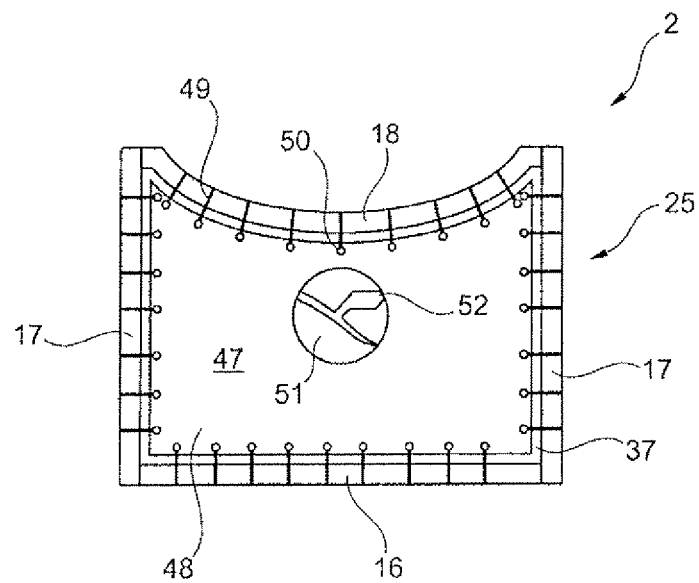
FIG. 21 a front view of a fourth embodiment of the partition wall according to the invention.

FIG. 21 shows a front view of the partition wall 2 whose frame 25 comprises the spars 16, 17 and 18. Both on its front and on its rear the framework 25 stretches a tension-mounted material 47, 48 each, wherein the tension-mounted material 48 that has been stretched on the rear is congruent with the tension-mounted material 47 that has been stretched on the front, and consequently it is not shown in the image. The two tension-mounted materials 47, 48 are spaced apart from each other by a distance that corresponds to the thickness of the framework 25. Both tension-mounted materials 47, 48 are stretched by means of straps 49. Detachable connection of a strap 49 with one of the two tension-mounted materials 47, 48 takes place by means of a press- or snap fastener 50 whose one part is located in the edge region of the tension-mounted material 47, 48 while its other part is rigidly connected to the strap 49. Attachment of the tension-mounted material 47, 48 can, however, also take place, for example, by means of carbine swivels or clamps. At the centre in relation to the lateral spars 17, in the upper third the tension-mounted material 47 comprises a circular recess that is backed by a transparent film 51, onto which in turn a non-translucent company logo 52 has been printed. Between the two tension-mounted materials 47, 48 there is an illumination device (not shown). In its switched-on state, said illumination device projects light through the translucent tension-mounted materials 47, 48. In the figure this is indicated by the area depicted in irregular grey.

Figure 22:
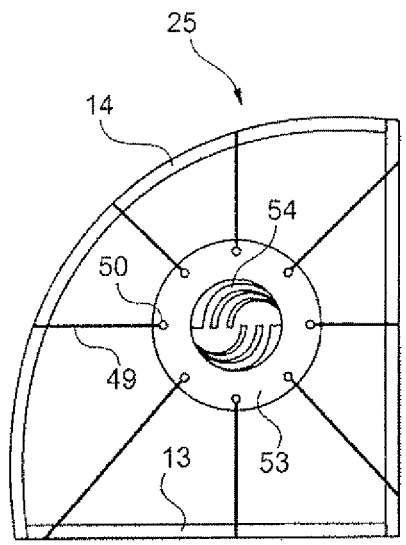
FIG. 22 a front view of a fifth embodiment of the partition wall according to the invention.
Figure 23:
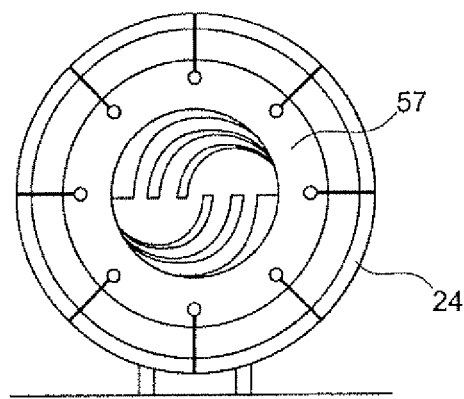
FIG. 23 a front view of a sixth embodiment of the partition wall according to the invention.
Figure 24:
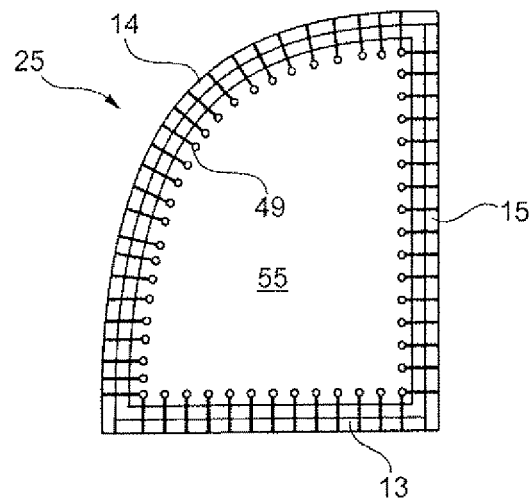
FIG. 24 a front view of a seventh embodiment of the partition wall according to the invention.
Figure 25:
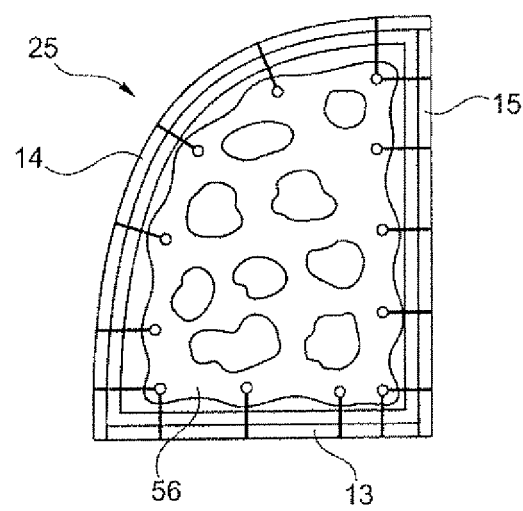
FIG. 25 a front view of a eighth embodiment of the partition wall according to the invention.
Figure 36:
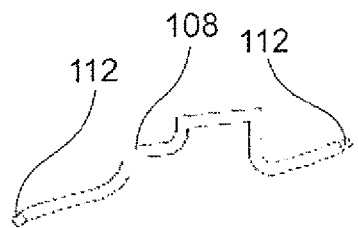
FIG. 36 an eighth system component.
Figure 37:
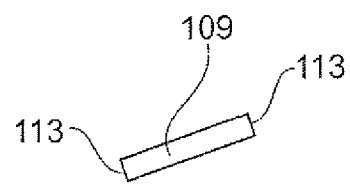
FIG. 37 a ninth system component.
Figure 38:
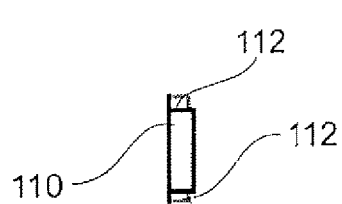
FIG. 38 a tenth system component.
Figure 39:
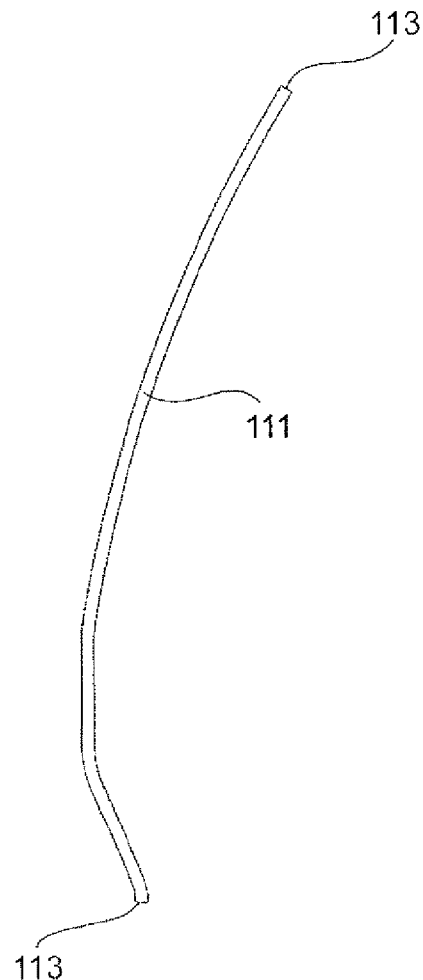
FIG. 39 an eleventh system component.

FIGS. 22, 23, 24 and 25 show front views of four exemplary embodiments of the partition walls 1, 2. In this arrangement FIGS. 22, 24 and 25 show partition walls whose frameworks 25 comprise spars 13, 14 and 15. These frameworks 25 stretch various tension-mounted materials 53, 55, 56. FIG. 22 shows a circular tension-mounted material 53 with a company logo 54 in place, which company logo 54 is connected to the framework 25 by way of the straps 49 with the associated press- or snap fasteners 50. FIG. 23 shows a tension-mounted material 55 that comprises straps 48 tightly spaced apart. In contrast to this, FIG. 25 shows a tension-mounted material 56 that comprises an irregular geometric shape, thus imitating a cow hide. FIG. 23 shows the framework 25 already described in FIG. 6, which framework comprises a spar 24 that has been bent to the shape of a circle and that also stretches a tension-mounted material 57 in the form of a circle.

The present subject of the invention is associated with advantages in that it results in cost savings of up to 60% when compared to hitherto-known embodiments. In addition, weight savings of up to 50% can be achieved. Furthermore, the present subject of the invention allows very considerable scope in the design, as well as simple installation or change in a customer logo or cabin design. As a result of the flexible modular system, changes can be implemented easily and economically. Moreover, design changes are possible even during the boarding procedure. Furthermore, installation of large partition walls 1, 2 is possible, because it is also possible to connect the spars to a framework only at their subsequent location of installation.

In an exemplary manner FIGS. 26, 27 and 28 each shows a lateral partition wall in a first 150, a second 151, and a third embodiment 152. In this arrangement the partition walls 150, 151 and 152 comprise individually formed system components 101-120 of a modular system, which are shown in FIGS. 29 to 39. Thus the partition wall 150 shown in FIG. 26 comprises two first 101, a second 102, a third 103, a fourth 104, a fifth 105, a sixth 106, a seventh 107, and an eleventh 111 system component. Composing the partition walls 151 and 152 takes place in a manner that is analogous to composing the partition wall 150 comprising the system components 101 to 111. The partition wall 151 shown in FIG. 27 differs from the partition wall 150 shown in FIG. 26 in that it is lower and wider. The partition wall 152 shown in FIG. 28 differs from the partition wall 150 shown in FIG. 26 in that while its width is identical it is, however, lower in height.

FIGS. 29 to 39 show various individually shaped system components 101 to 111 that make it possible to produce partition walls 150-152 that differ from each other. Apart from straight system components 102, 103, 104, 106, 109 and 110 that comprise either no, one or two centring pins 112 or no, one or two centring openings 113, there are sharp-edged and angled 101, simply curved 105, or multiply curved system components 107 and 108. In particular the multiply curved system components 107 and 108 follow the inner contour of the passenger cabin. The position of the centring pins 112 and of the centring openings 113 on the individual system components 101 to 111 is selected in such a way that the lateral partition walls 150, 151 and 152 that are shown in FIGS. 26 to 28 can be produced without it being possible to incorrectly plug together the individual system components 101 to 111.

Figure 40:
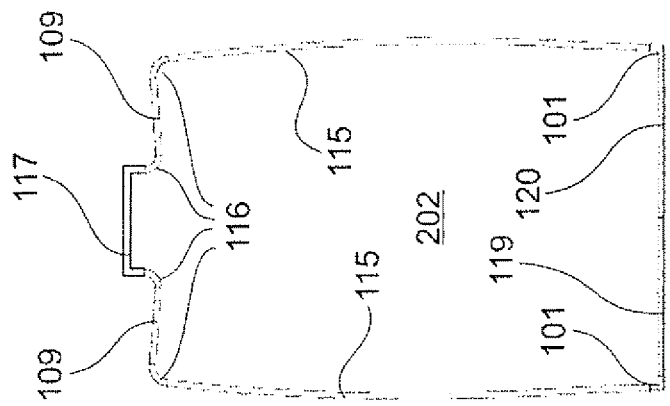
FIG. 40 a first centre partition wall.
Figure 41:
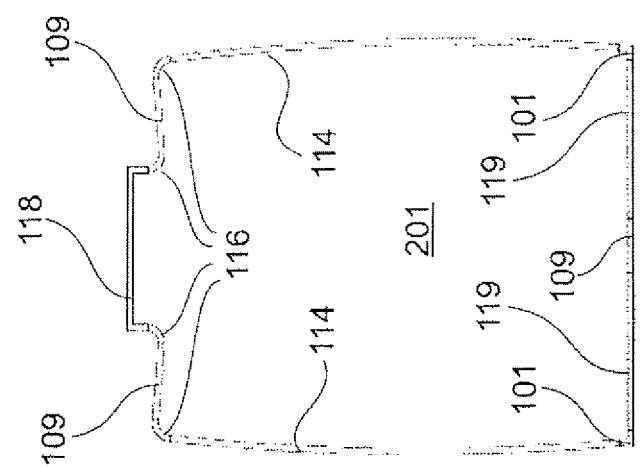
FIG. 41 a second centre partition wall.
Figure 42:
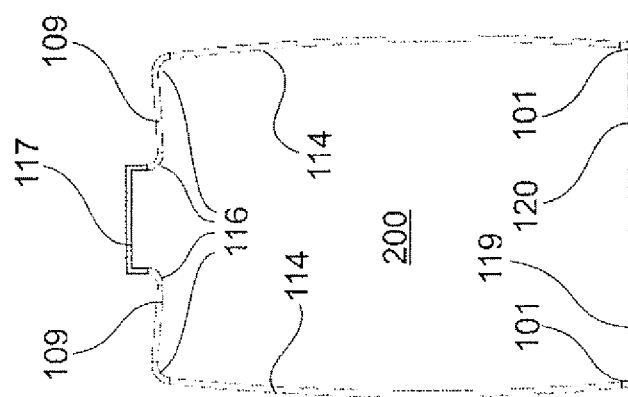
FIG. 42 a third centre partition wall.

In an exemplary manner, each one of FIGS. 40, 41 and 42 show a centre partition wall in a first 200, a second 201 and a third embodiment 202. In this arrangement the partition walls 200, 201 and 202 comprise individually formed system components 101-111 and 114-120 of a modular system, which system components are shown in FIGS. 29 to 39 and 43 to 49. It is thus possible to produce partition walls 200-202, as shown for example in FIGS. 40-42, which partition walls 200-202 differ from each other. Thus the partition wall 200 shown in FIG. 40 comprises, for example, two first 101, two ninth 109, two twelfth 114, four fourteenth 116, a fifteenth 117, a seventeenth 119 and an eighteenth 120 system component. Composing the partition walls 201 and 202 takes place analogously to composing the partition wall 200 made of the system components 101-111 and 114-120. Likewise, in the system components 114-120, shown in FIGS. 43 to 49, analogously to the system components 101-120 shown in FIGS. 29 to the following applies: these system components 114-120 have either no, one or two centring pin(s) 112 and correspondingly no, one or two centring opening(s) 113. The centre partition wall 201 shown in FIG. 41 differs from the partition wall 200 shown in FIG. 40 in that while its height is the same, its width is greater. This can be achieved in that in the upper region of the partition wall 200 the U-shaped system component 117 is replaced by the system component 118, and in the lower region, which faces the aircraft floor, the system component 120 is replaced by the system component 119 in conjunction with the system component 109. The partition wall 202 shown in FIG. 42 differs from the partition wall 200 shown in FIG. 40 in that while its width is identical, it is, however, higher. This can be achieved by replacing the two system components 114 with the system components 115.

Figure 50:
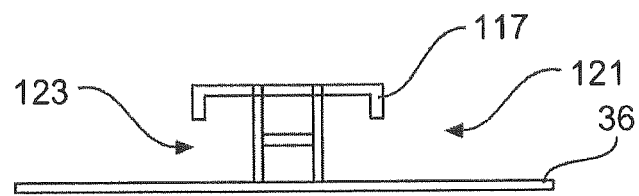
FIG. 50 a first accommodation device.
Figure 51:
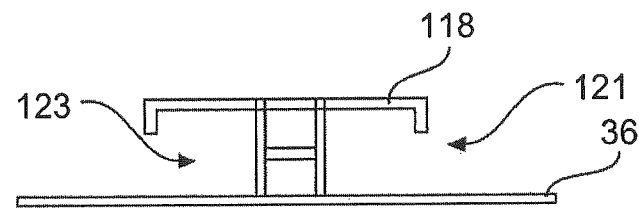
FIG. 51 a second accommodation device.

FIGS. 50 and 51 show a first 121 and a second accommodation device 122. The first 121 and the second accommodation device 122 differ only in that in the second accommodation device 122 the fifteenth system component 117 is replaced by the eighteenth system component 118 that is longer. Between the system component 117 or 118 and the cross-strut 36 a frame 123 extends, wherein the frame 123 is rigidly connected, preferably welded, to these two components. As is clearly shown in FIGS. 52 and 54, the frame 123 comprises a first cross-spar 124, which can also at the same time be integrated in the system component 117 or 118, and a cross-spar 125 that is arranged parallel to the above. The ends of the cross-spars 124 and 125 are welded to a first 126 and a second longitudinal spar 127.

Figure 52:
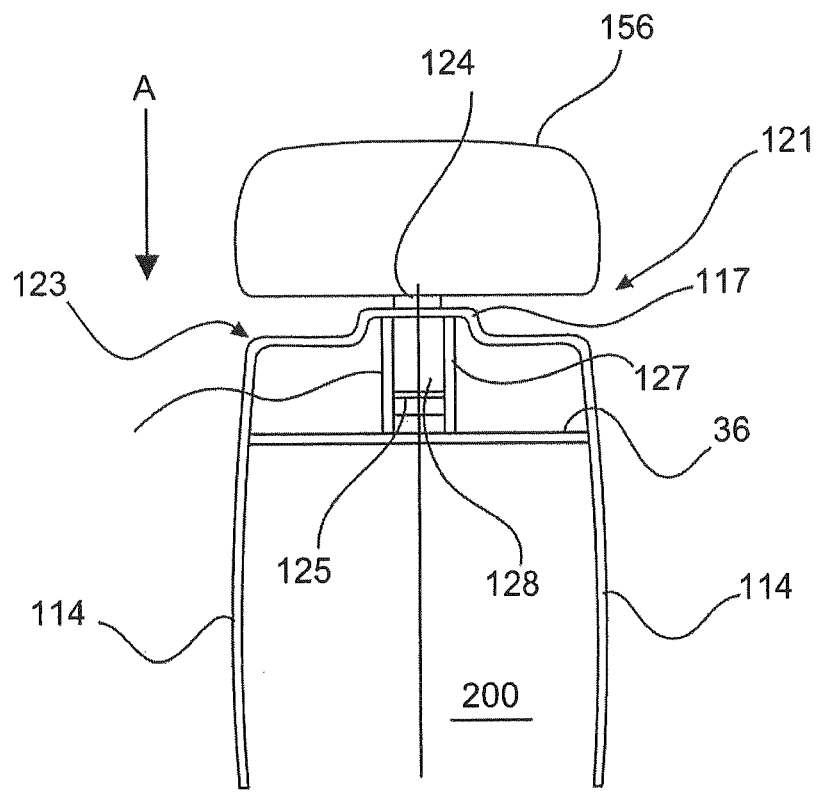
FIG. 52 a centre partition wall with a frame and a tongue.
Figure 53:
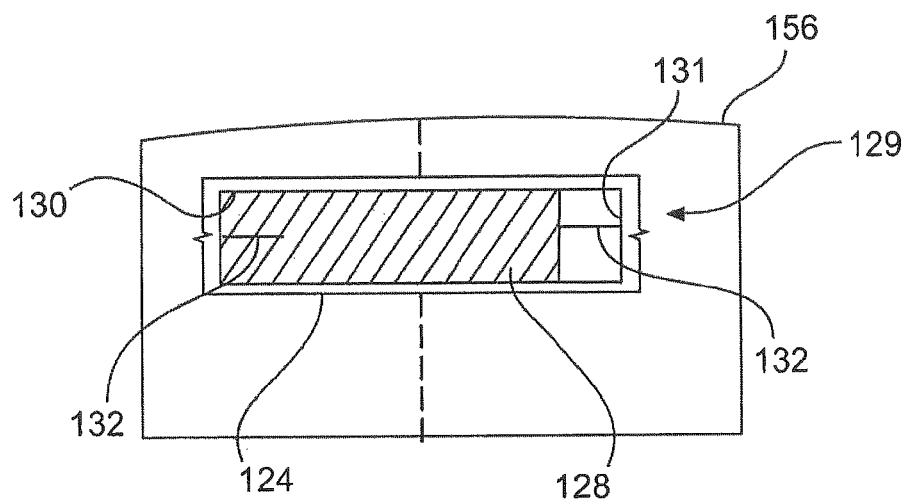
FIG. 53 a top view of the centre partition wall in the region of the tongue of FIG. 52.

FIG. 52 shows the centre partition wall 200, in which in the upper region the fifteenth system component 117 has been replaced with the first accommodation device 121. The accommodation device 121 is welded into the partition wall 200. A tongue-like device 128, hereinafter referred to as a "tongue", engages the frame 123. The tongue 128 is attached to a substructure 156 of the aircraft, namely a hatrack. The tongue 128 projects into the frame 123 in such a way that under any load conditions experienced in the aircraft it is in permanent engagement with the first 124 and the second cross-spar 125. The engagement of the tongue 128 in the frame 123 becomes more clearly evident when the view onto the partition wall 200 is along the direction of arrow A. This top view is shown in FIG. 53. In particular it should be pointed out that the frame 123 with its cross-strut 36 is dimensioned in such a way that they do not project from the separation wall 200.

FIG. 53 shows the first cross-spar 124, whose outside contour is identical to that of the twelfth system component 114. The design of the cross-spar 124 is identical to that of the cross-spar 125. Along its direction of longitudinal extension the cross-spar 124 comprises a rectangular slot 129 with longitudinal sides 130 and cross-sides 131. The tongue 128 engages this slot 129. The diagram clearly shows that the tongue 128 contacts the longitudinal sides 130 of the slot 129, while there is a space 132 between it and the cross-sides 131 of the slot 129. Thus the tongue 128 affixes the partition wall 200 only in longitudinal direction of the aircraft. Across the longitudinal direction of the aircraft the partition wall 200 is movable. Thus, any forces resulting from compression or acceleration, as experienced during takeoff and landing of the aircraft, are not transmitted from the partition wall 200 to the passenger-cabin trim components and vice versa.

It should be mentioned that the system components 119 and 120 of the partition wall 200 are anchored to seat rails (not shown in the diagram).

Figure 54:
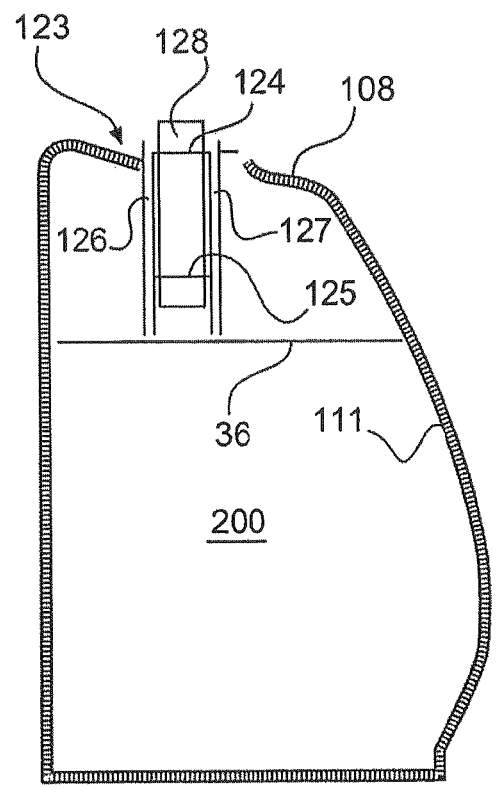
FIG. 54 a lateral partition wall with a frame and a tongue.

FIG. 54 shows the lateral partition wall 152 described in FIG. 28, in which in the eighth system component 108 the frame 123 with the associated cross-strut 36 is integrated. Analogously, the description of FIG. 52 also applies to FIG. 54.

FIG. 55 shows the lateral partition wall 150 shown in FIG. 26, but without the tension-mounted material. In the present example the framework 25 is reinforced by five cross-struts 36 that are rigidly connected to the framework 25 at different heights. The cross-struts 36 comprise attachment options 133 for mounting parts.

FIG. 56 shows the lateral partition wall 150 shown in FIG. 55, wherein the cross-struts 36 comprise mounting parts 134, 135 and 136. Thus on the cross-struts 36, a literature pocket 134, a baby bassinet 135 and an LCD monitor 136 are arranged, one above the other. In this diagram, too, for the sake of clarity the tension-mounted material is not shown. In this arrangement the connection elements for attaching the various mounting parts 134, 135 and 136 can differ from each other. In particular in the case of attachment of the baby bassinet 135 the use of quickly detachable connection elements such as quick-acting closure devices 34 can be helpful.

Figure 57:
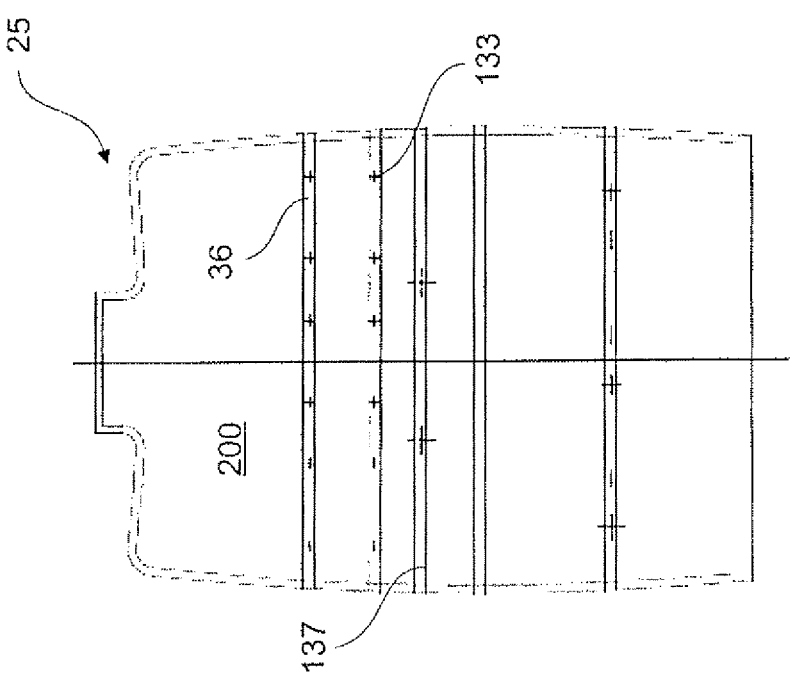
FIG. 57 a centre partition wall with cross-struts.

FIG. 57 largely corresponds to FIG. 55. However, instead of the lateral partition wall 152 a centre partition wall 200 is shown. In contrast to the partition wall 152 the centre partition wall 200 shown divides three seats. Thus, in the cross-struts 36, attachment options 133 for three LCD monitors 136 and three literature pockets 134 are provided. Although the partition wall 200 is intended for three passengers, the centre cross strut 137 provides attachment options 133 for one baby bassinet 135. Of course, in a wider centre partition wall 200 it is also possible to accommodate a greater number of LCD monitors than only for three passengers, and correspondingly also a greater number of baby bassinets.

Figure 58:
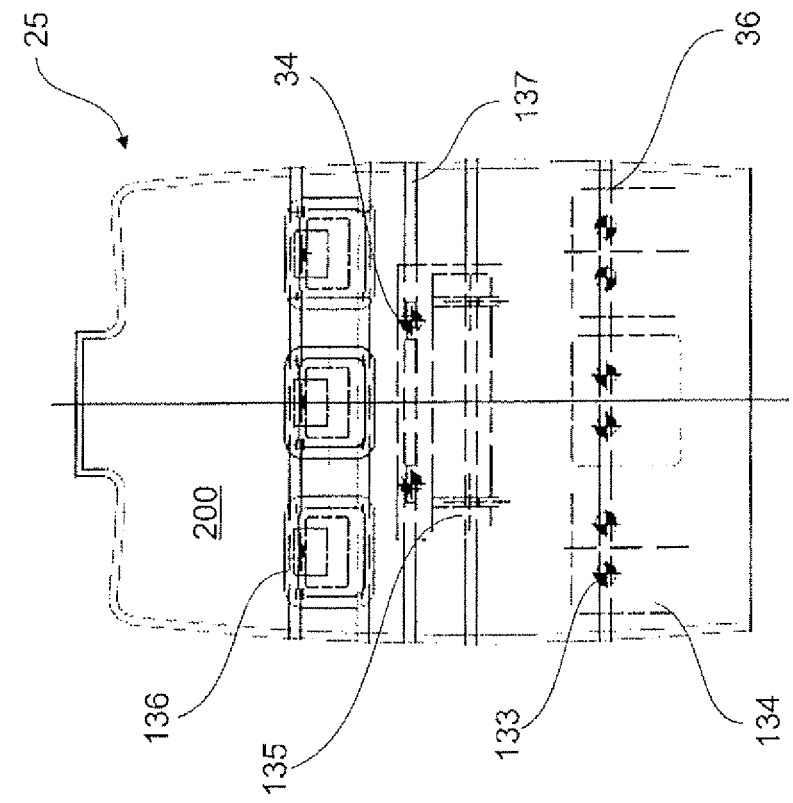
FIG. 58 a centre partition wall with mounting parts.

FIG. 58 shows the partition wall 200 described in FIG. 57, with the mounting parts 134, 135 and 136.

Figure 59:
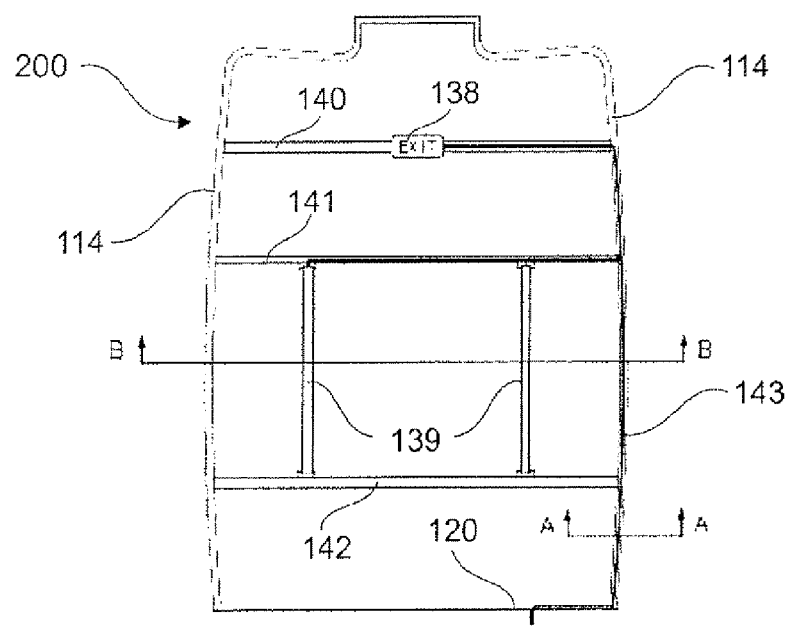
FIG. 59 a centre partition wall with an illumination device.
Figure 60:
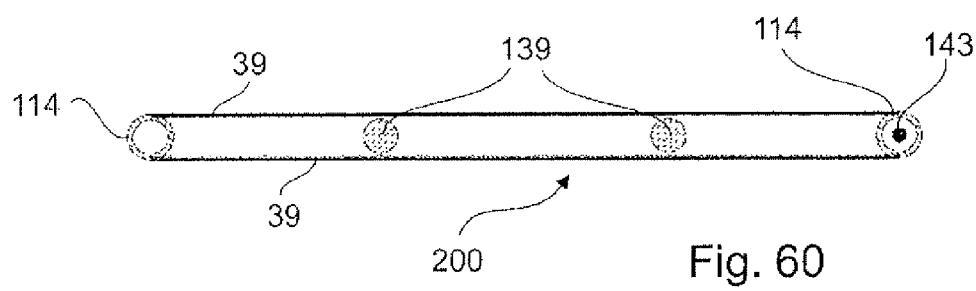
FIG. 60 a cross-section of a centre partition wall of FIG. 59.

FIG. 59 shows the centre partition wall 200 with illumination devices 138 and 139. Here again, for the sake of clarity, the tension-mounted material is not shown. A first 140, a second 141 and a third cross-strut 142 are rigidly connected to the twelfth system component 114 of the partition wall 200. On the first cross-strut 140 an illuminateable display element 138 is attached in the centre. Between the second 141 and third cross-strut 142, two fluorescent tubes 139, spaced apart from each other and arranged parallel, extend. A cable 143 transmits the required power from the power supply (not shown in the diagram) to the illumination means 138, 139. In this arrangement the cable 143 enters the eighteenth system component 120, attached to the floor of the aircraft, extends within this eighteenth system component 120, and onward to the twelfth system component 114 before reaching, on the one hand, the fluorescent tubes 139 by way of the second cross-strut 141. On the other hand, the cable 143 is guided in the twelfth system component 114 onward to the first cross-strut 140, in order to lead through it up to the illumination means of the illuminateable display element 138. Along the reference characters B-B there is a section which is shown in FIG. 60. Along the reference characters A-A there is a section through the twelfth system component 114, which section is shown in FIG. 61.

Apart from showing the already described two twelfth system components 114, the two fluorescent tubes 139 and the cable 143 that is guided in the twelfth system component 114, FIG. 60 shows the tensioning materials 39 applied to the front and the rear of the partition wall 200.

Figure 61:
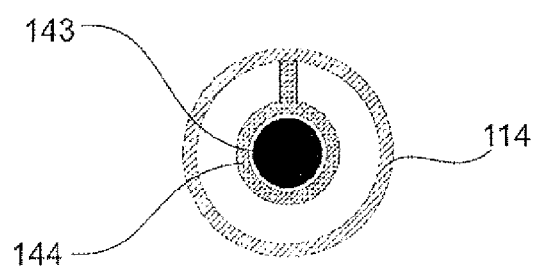
FIG. 61 a cross-section of a spar of the centre partition wall of FIG. 59.

Apart from showing the twelfth system component 114 and the cable 143, FIG. 61 shows a cable holding device 144 that guides the cable 143 within the twelfth system component 114 and also affixes said cable 143.

Thus a partition wall for an aircraft is provided, which partition wall effectively divides the individual regions within the passenger cabin, features a very a lightweight construction, with its support element being provided by means of a modular system, and with its tensioning materials being quickly exchangeable.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A partition wall separating first and second longitudinally adjacent regions in an aircraft, the partition wall comprising:
   a support element extending across a longitudinal direction of the aircraft;
   a tension-mounted material;
   a cross-strut for stiffening the support element; and
   a plurality of connecting elements spaced from each other and tension-mounting the tension-mounted material to the support element at least on a first side and on a second side of the support element;
   wherein the support element comprises a plurality of individually formed system components of a modular system;
   wherein the tension-mounted material is supported by the support element substantially surrounding the tension-mounted material such that the partition wall is created in the aircraft; and
   wherein the partition wall is mounted to a substructure of the aircraft and affixed only in the longitudinal direction of the aircraft, thereby preventing forces acting across the longitudinal direction from being transmitted to the partition wall from the substructure or from the partition wall to the substructure.

2. The partition wall of claim 1, wherein the support element comprises a framework.

3. The partition wall of claim 2, further comprising an illumination device in the framework.

4. The partition wall of claim 3, further comprising a cable extending to the illumination device within at least one of the spars.

5. The partition wall of claim 2, wherein the tension-mounted material is configured to be tension-mounted on both sides of the framework.

6. The partition wall of claim 2, wherein the framework comprises at least one quick-acting closure device.

7. The partition wall of claim 1, wherein the plurality of system components comprise a plurality of spars; and wherein the spars are pluggable.

8. The partition wall of claim 7, wherein the spars are affixable among themselves by means of a tensioning mechanism.

9. The partition wall of claim 8, wherein the tensioning mechanism comprises a quick-acting closure device.

10. The partition wall of claim 7, wherein one of the spars comprises a joint.

11. The partition wall of claim 7, wherein one of the spars is configured to be telescopic.

12. The partition wall of claim 7, wherein one of the spars comprises a light and stable material.

13. The partition wall of claim 1, further comprising an illumination device attached to the at least one cross-strut.

14. The partition wall of claim 1, wherein the partition wall comprises an emergency exit illumination.

15. The partition wall of claim 1, wherein the support element comprises a frame; and
   wherein an affixation device rigidly connected to a substructure of the aircraft projects into the frame of the support element and affixes the partition wall only in longitudinal direction of the aircraft.

16. The partition wall of claim 15, wherein the frame comprises a first and a second longitudinal spar and a first and a second cross-spar;
   wherein the first and the second cross-spar each comprises a slot extending along their direction of longitudinal extension; and
   wherein the affixation device feeds through the slots.

17. The partition wall of claim 1, wherein the support element comprises a frame, and wherein the frame is rigidly connected to one of the at least one cross-struts.

18. The partition wall of claim 1, wherein the plurality of connecting elements is selected from the group consisting of a loop, a strap, a rubber strap, a press-and snap fastener, a rubber cord, and a hook.

* * * * *